June 10, 1969     L. A. ASCANI, JR     3,448,945
CONVERTIBLE PROPULSION PACKAGE
Filed Aug. 9, 1966     Sheet _1_ of 4
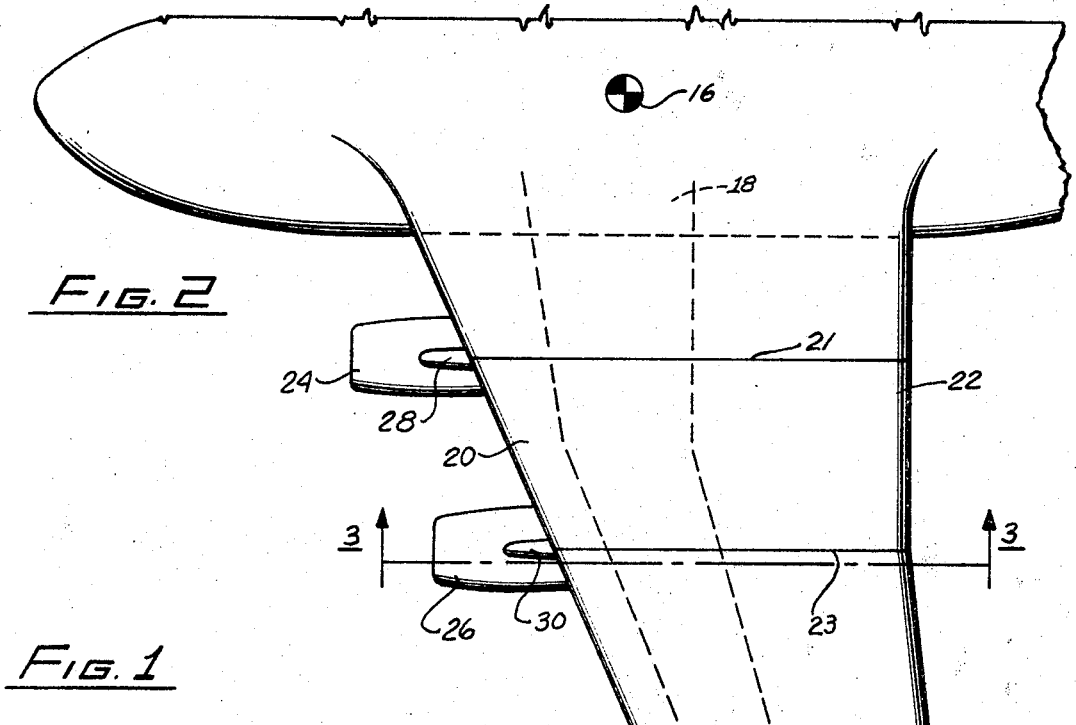
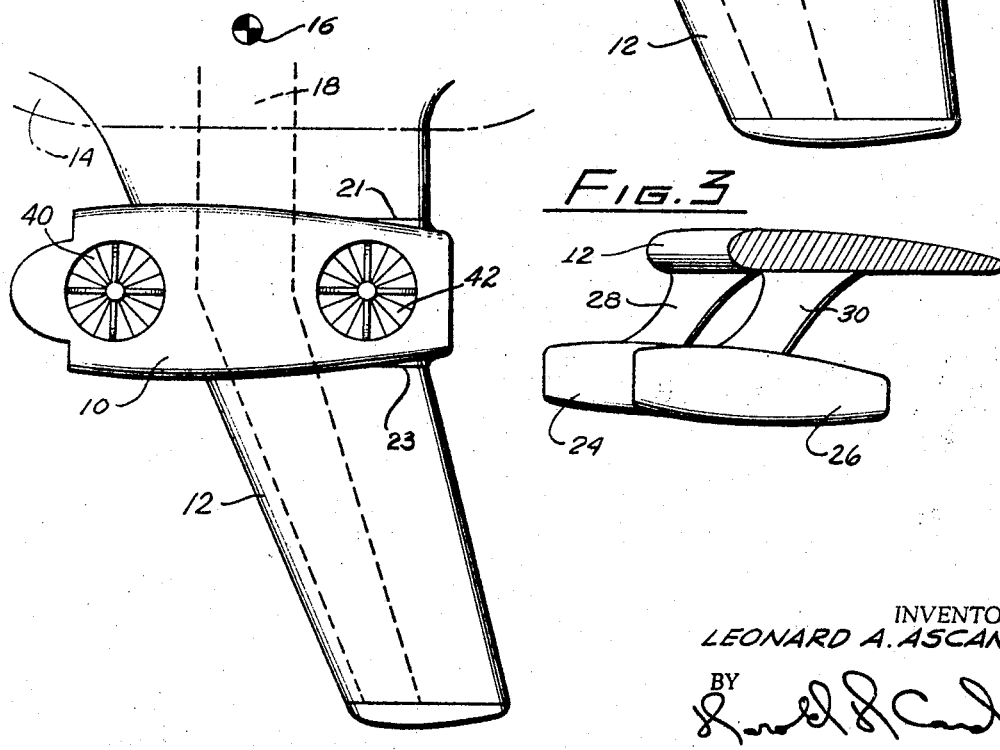
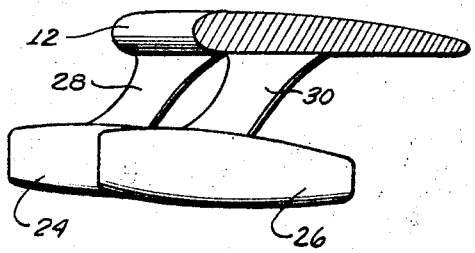
INVENTOR.
LEONARD A. ASCANI, JR.
BY
ATTORNEY June 10, 1969 L. A. ASCANI, JR 3,448,945
CONVERTIBLE PROPULSION PACKAGE
Filed Aug. 9, 1966 Sheet 2 of 4
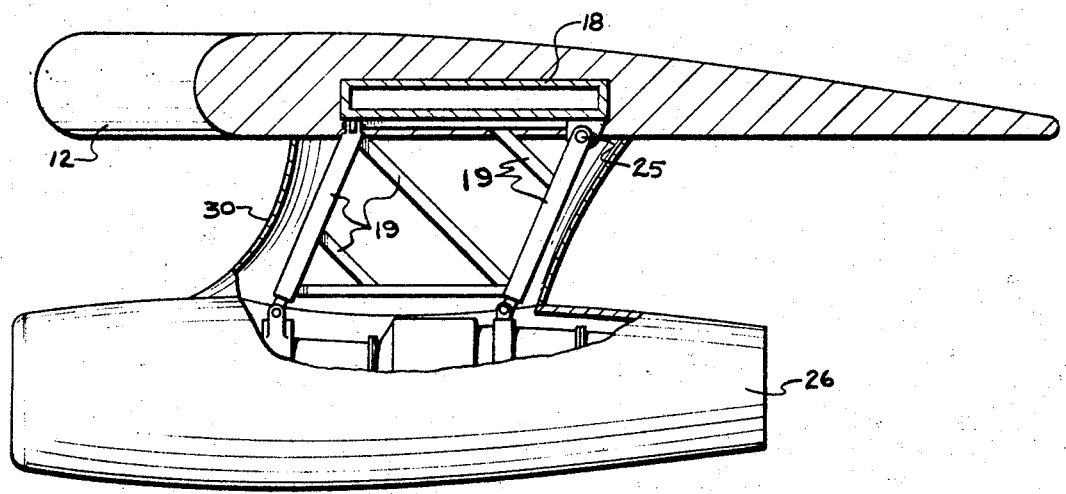
FIG. 3A
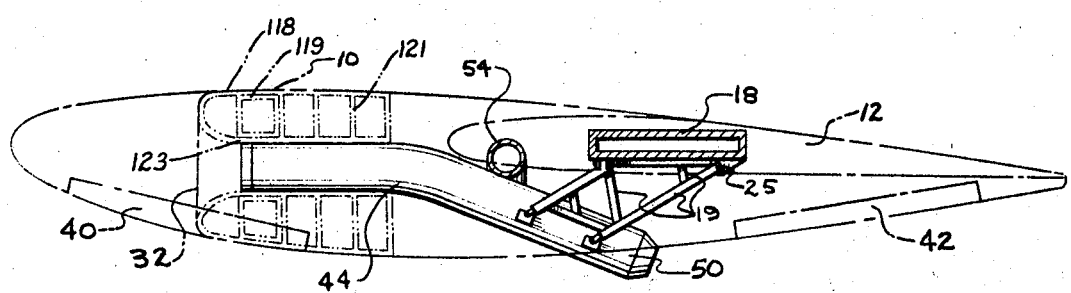
FIG. 5A
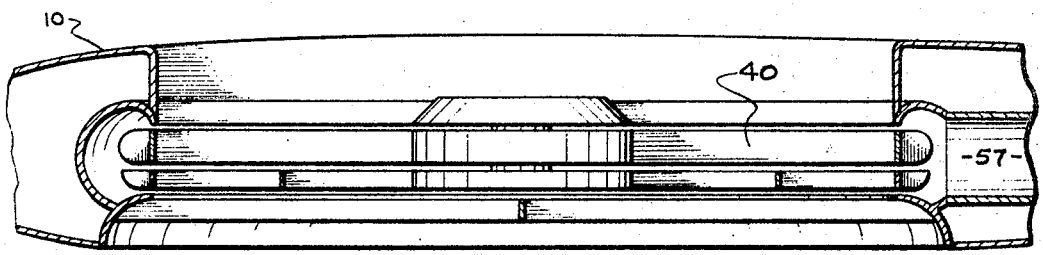
FIG. 7
INVENTOR.
LEONARD A. ASCANI, JR.
BY
ATTORNEY

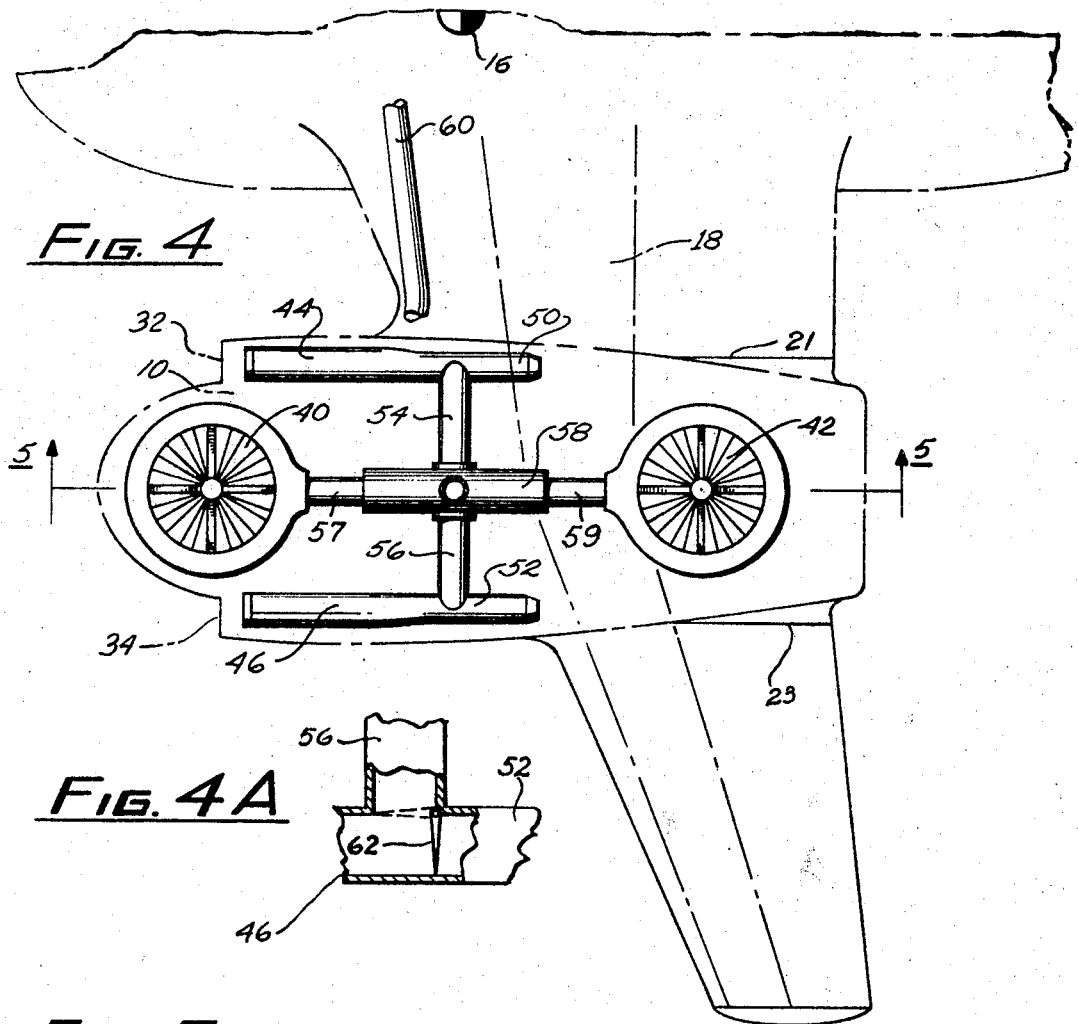

June 10, 1969   L. A. ASCANI, JR   3,448,945
CONVERTIBLE PROPULSION PACKAGE

Filed Aug. 9, 1966   Sheet 4 of 4

INVENTOR.
LEONARD A. ASCANI, JR.
BY
ATTORNEY

United States Patent Office 3,448,945
Patented June 10, 1969

3,448,945
CONVERTIBLE PROPULSION PACKAGE
Leonard A. Ascani, Jr., Palos Verdes Estates, Calif., assignor to North American Rockwell Corporation, a corporation of Delaware
Filed Aug. 9, 1966, Ser. No. 571,340
Int. Cl. B64c 29/00; B64d 9/00
U.S. Cl. 244—12          8 Claims

ABSTRACT OF THE DISCLOSURE

An air vehicle has releasable and interchangeable propulsion systems for converting the same into a high speed transport or into a VTOL vehicle. In the VTOL mode, the wing-mounted nacelles contain fans situated fore and aft of the main wing spar to avoid oddly shaped or heavy spar configurations. The fans are turbine driven by exhaust gas from two turbojet engines having aft-directed gas exits and diverter valves.

---

This invention concerns improved mounting method and structural arrangement for a propulsion system on an aircraft or similar vehicle, especially one designed for vertical or substantially vertical take-off. More particularly, the inventive concept relates to vertical take-off and landing power plant systems so mounted as to permit such systems to be removed and quickly replaced by a similar system or by a system of different configuration as may be required to meet changed performance requirements. In addition, the invention in this case relates to a propulsion system configuration adapted to provide the least possible weight and drag penalties in respect of airframe supporting structure.

Among the various types of tactical aircraft designed for military use and which provide certain advantages in the field of commercial aviation, one broad class includes transports adapted to carry relatively high loads at considerable speeds requiring long runways for take-off and landing, while another broad class comprises slower, less efficient aircraft, adapted to carry small loads but capable of take-off and landing in jungles or the like without benefit of runways. The latter class of air vehicle is broadly characterized by the designation VTOL meaning vertical take off and landing. Propulsion systems in VTOL vehicles include various combinations of ducted fans, gas generators, jet augmentation devices, et cetera, adapted to provide lift by directing a stream of gas substantially vertically downward. When a suitable altitude is reached, such lifting devices are severely compromised in their performance capability of providing sufficient forward cruising speed for efficiently and economically transporting heavy loads. Moreover, where ducted fans are situated within wings, the huge holes required in such cases impose substantial penalties on wing efficiency and vehicle weight, since wing spars or other primary structural members must be oddly shaped and frequently rerouted to achieve the required strength for support of the wing and propulsion system. Moreover, where hot gases are used to power the lift fans and the sources for such gas are not closely adjacent to the fan, long and heavily shielded ducting is required to connect the fans with such source, and support members of the air vehicle are required to be stronger due to high temperatures in the vicinity of hot gas ducts. Thus, it would be seen that a wide disparity of the foregoing performance characteristics exists, whereby VTOL vehicles are incapable of transporting heavy loads at useful forward speeds compared with conventional transport aircraft which are best suited for the purpose but which cannot take off or land vertically. Hence, a definite need exists for an air vehicle designed to meet both types of performance requirements.

Moreover, when ducted fans or other power plants adapted to provide vertical lift are located within complex internal structure of a wing or the like, engine repair or replacement is made difficult due to limited access to the engine, and replacement is often a tedious, time-consuming operation.

Accordingly, it is a principal object of the invention in this case to provide propulsion system means of improved efficiency and capability in achieving vertical lift for VTOL aircraft, and mounting means which provide improved access and ease of replacement for such propulsion system means.

It is a further object in this case to provide propulsion system means as stated in the above object which avoid drastic discontinuities in the aircraft primary structure such as wing spars as required to compensate for heating or ducting of lift fans.

It is another object in this case to provide propulsion system means as stated in the above objects capable of complete removal from the vehicle in which such means are mounted, and replacement by a propulsion system of different configuration.

Other objects and advantages of the invention in this case will become apparent upon a close reading of the following detailed description of an illustrative embodiment of the invention, reference being had to the accompanying drawings wherein:

FIGURE 1 shows a plan view of an aircraft wing incorporating the novel propulsion system package comprising the invention in this case, FIGURE 2 shows the same wing as FIGURE 1 but with the propulsion system package of FIGURE 1 replaced by a different engine arrangement, FIGURE 3 shows a side view, fragmented and partly in cross-section, of the engine arrangement shown in FIGURE 2, FIGURE 3A shows a view corresponding with FIGURE 3, partly broken away to show engine supporting structure.

FIGURE 4 shows a schematic view corresponding with FIGURE 1 but with the vehicle indicated in ghost lines to show internal details of the novel propulsion system disclosed herein, FIGURE 4A shows an internal valve detail in the structure shown by FIGURE 4.

FIGURE 5 shows a side schematic view of the engine arrangement from FIGURE 4 and taken generally along line 5—5 of FIGURE 4, and FIGURE 5A shows a view corresponding with FIGURE 5 but including details of the engine support structure.

FIGURE 7 shows a cross-sectional view taken through the center of the forward fan of FIGURE 4.

Figure 6:
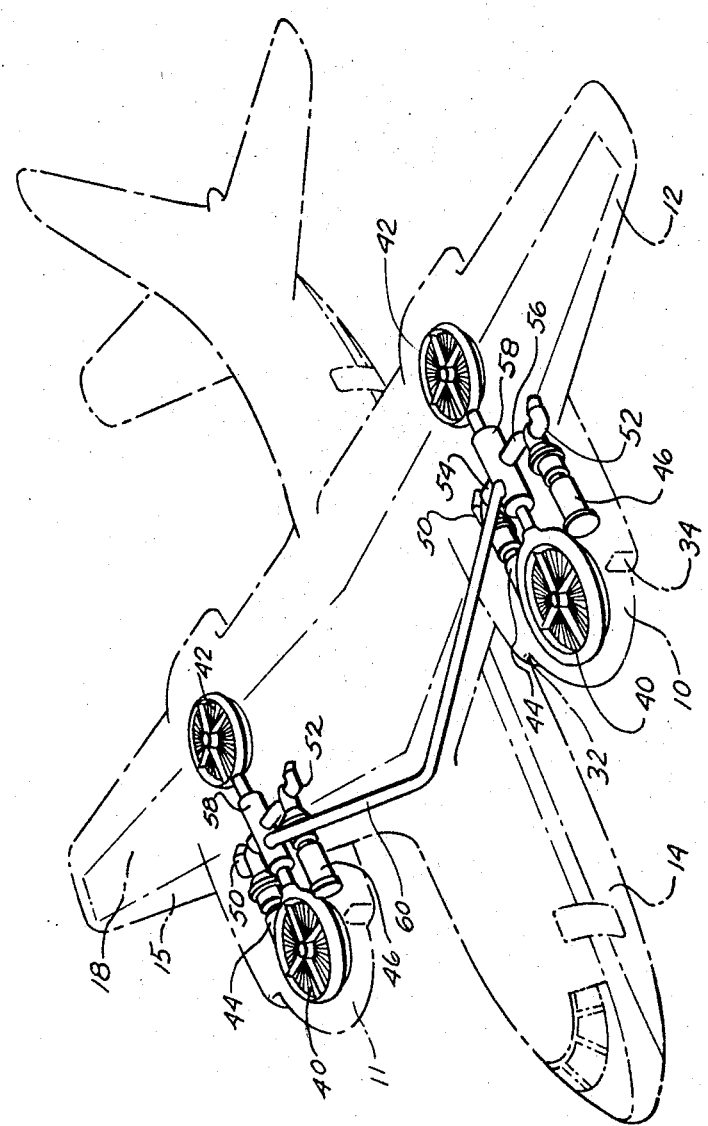
FIGURE 6 is a general perspective view of an air vehicle outlined in ghost lines, showing the novel arrangement of components in a propulsion system incorporating the inventive principles disclosed herein.

Referring to the drawings described above and particularly to FIGURE 1, it may be seen that the invention in this case includes a nacelle 10 containing a propulsion system and adapted to be mounted on wing 12 of an aircraft 14 having center of gravity 16 and a spar or main support member 18 which may take the form of a box beam inside the wing for structural support thereof. As seen from FIGURE 6, air vehicle 14 has another wing 15 corresponding to wing 12, and wing 15 includes a nacelle 11 corresponding to nacelle 10 whereby only one nacelle need be described in detail. Nacelle 10 is removable from wing 12 whereby the removed structure may be replaced by suitable wing components 20 and 22 shown in FIGURE 2, lines 21 and 23 denoting the contact areas between sections 20 and 22 with the adjacent permanent wing structure. Removability of nacelle 10 results from the separable connection between engine 44 and spar 18 described more fully below, since the nacelle is supported on the engine. Thus, many different ways are known in the prior art for interconnecting a nacelle and an engine such as suggested, for example, by U.S. Patent 2,978,209 to Kerry, issued Apr. 4, 1961, the teachings of which may be applied to this case in the manner shown by FIGURE 5A. In FIGURE 5A, nacelle 10 has outer wall 118 and inner wall 123 separated by partitions 121 and containing tubular member 119 in the same general arrangement as shown by FIGURES 4 and 5 of the Kerry patent. Inner wall 123 contacts and structurally engages the outer surfaces of engine 44 to support nacelle 10 thereon, whereby removal of engine 44 from spar 18 causes removal of the nacelle from wing 12. Structural portions 20 and 22 are adapted to support one or more power plants 24 and 26 which typically comprise jet engines supported on wing 12 by fairings or struts 28 and 30 as shown more particularly by FIGURE 3. Thus, nacelle 10 is useful for VTOL, performance where necessary in the mission or tactical requirements of vehicle 14, and may be replaced by engines 24 and 26 together with sections 20 and 22 in converting vehicle 14 for use as a transport.

Referring to FIGURE 4, the internal details of nacelle 10 may be seen to include lifting force generating means in the forms of fans 40 and 42 which are arranged generally in tandem and are located with respect to center of gravity 16 so that the mean line of lifting force created by each fan will be spaced equidistantly fore and aft of the stated center. Moreover, it may be seen from FIGURE 4 that the necessary holes through nacelle 10 which are aligned directly above and below the rotating portion of fans 40 and 42 may be situated fore and aft of spar 18, respectively, for a purpose discussed in greater detail hereinbelow.

Dual-purpose gas generating means in the form of turbojet engines 44 and 46 are also contained within nacelle 10 and are adapted to supply hot gas either for forward propulsion or to rotate fans 40 and 42 through a system of ducts. Engines 44 and 46 have aft exhaust gas exits 50 and 52 connected therewith, respectively, and function to provide forward thrust when some or all of the gas generated by the engines is directed through the stated exits. Ducts 54 and 56 communicate with exit sections 50 and 52, respectively, and serve to divert by suitable valves of well-known type, shown schematically by valve 62 in FIGURE 4A, some or all of the exhaust gas from engines 44 and 46 into a plenum chamber 58, from whence gas may flow to either or both of fans 40 and 42, through ducts 57 and 59, respectively. In addition, a cross transfer duct 60 interconnects the plenum chambers of each nacelle in vehicle 14 as seen more particularly from FIGURE 6, permitting the fans in either nacelle of vehicle 14 to operate from gas supplied by either or both nacelles 10 and 11. Appropriate valves adapted to close off exit openings 50 and 52 or duct sections 54 and 56 may take any of several suitable forms known to the prior art for controlling hot gas flow and may be operated as necessary to divert any portion of exhaust gas from engines 44 and 46 as required for forward propulsion or as desired for operation of fans 40 and 42. It will be understood that transfer duct 60 comprises a means to insure adequate lift and controlability of vehicle 14 during malfunction or failure of any of the gas generators contained within either nacelles 10 or 11 and further comprises means to transfer power from one nacelle to the other for stability and lateral control functions.

It is a distinct advantage of the propulsion system configuration and its relationship with vehicle 14 as disclosed hereinabove that the entire propulsion system comprising both fans 40 and 42 as well as engines 44 and 46 are mounted on nacelle 10, for example, whereby removal of the nacelle from wing 12 may be quickly and easily accomplished to permit replacement of nacelle 10 with wing sections 20 and 22 incorporating conventional jet engines 24 and 26 as shown in FIGURE 3. It is a further advantage that the location of fans 40 and 42 symmetrically about a line passing through center of gravity 16 permits stable operation and precise control of aircraft attitude and movement by varying the lift force obtained from either or both of the stated fans. Moreover, location of fans 40 and 42 fore and aft of spar 18, respectively, avoids the necessity of forming holes in the spar such as would result from location of a fan in that portion of wing 12 which contains the spar. Because a single primary load carrying member in a wing affords greater strength for its total weight than a plurality of spars would do, location of fans 40 and 42 in spaced relationship from spar 18 results in a stronger wing 12 and a lighter spar. Moreover, isolation of fans 40 and 42 from the the primary wing structure by locating the fans within nacelle 10 avoids the necessity for using heavy steel alloys or load carrying members of increased thickness and weight due to the heating effects of hot gas duct and fans. In the structure disclosed hereinabove, all of the hot structure surrounding or closely proximate the fans is contained within the nacelles and thus is isolated from the load carrying members such as spar 18. Moreover, it may be seen that problems associated with debris from a downwardly directed gas flow from one fan throwing up debris into other air inlets or fans is successfully avoided by the engine configuration disclosed herein. Thus, main air inlets 32 which supply air to engines 44 and 46 are located closely adjacent to the downwardly directed stream of air from forward fan 40 in nacelle 10 and would not ingest rocks or debris blown radially outward and rearwardly from the area of impact of such downwardly directed stream.

Referring to FIGURES 4 and 6, it will be understood that fans 40 and 42 are rotatably mounted about a suitable center hub and are forcibly driven by an annular turbine of conventional type known to the prior art as shown, for example, in FIGURE 8 of U.S. Patent No. 3,161,374 issued Dec. 15, 1964 to R. W. Allred, et al., and suggested by FIGURE 7 of the present case. The details of the fan and tip-driven turbine blades thereon are not critical to the inventive concept disclosed herein and may vary considerably without departing from the overall scope thereof. Similarly, the structural details for mounting engines 44, 46 or engines 24, 26 to spar 18 may take any convenient form known to the prior art and are not critical to the broad concept disclosed herein.

Illustratively, the hinge pin and clevis connection 20–25 used for mounting engine 13–16 to spars 10 shown in FIGURE 1 of U.S. Patent 2,978,209 issued Apr. 4, 1961 to T. H. Kerry may be used to releasably secure engines 24 or 26 as shown in FIGURE 3a of this case or engines 44, 46 as suggested in FIGURE 5a of the instant case. Many other expedients known to the prior art may be used to make the engine and spar connections in addition to the pin and clevis arrangement thus suggested. Also, while spar 18 is shown as a box beam in the accompanying drawings, it will be understood that the cross-sectional shape of the spar is not critical to the inventive concept disclosed herein, and spar 18 may comprise any combination of beams known to the prior art including I-beams without departing from the overall concept disclosed herein. Pin 25 and struts 19 shown in FIGURES 3a and 5a of the accompanying drawings correspond with the same structural items shown in FIGURE 1 of mentioned U.S. Patent 2,978,209.

I claim:
1. In an aircraft:
   a fuselage having a longitudinal axis through the center thereof,
   a wing joined to said fuselage and extending outwardly on each side thereof symmetrically about said axis in plan view,
   a main load-carrying spar within each of said wings, nacelle support means on each of said wings and spaced-apart from said fuselage, a pair of elongate nacelles, one nacelle being supported on each of said nacelle support means, a pair of fans in each of said nacelles for providing vertical lifting force, each pair of fans being situated in spaced relationship from said spar in plan view with one of said pair forward and the other of said pair aft of said spar, so that the plan view area of each said fan does not overlap the plan view area of said spar, and drive means in each of said nacelles for driving each of said fans.

2. In an aircraft:

a fuselage having a longitudinal axis through the center thereof, a wing joined to said fuselage and extending outwardly on each side thereof symmetrically about said axis in plan view, primary load-carrying structure within each of said wings comprising a continuous elongate beam extending from said fuselage outwardly therefrom and substantially coextensive with said wings, engine support means on each of said wings for supporting engines externally of said wings and in spaced relationship with said fuselage, a pair of elongate nacelles, one nacelle being supported on said engine support means on each of said wings and symmetrically about said axis in plan view, at least one vertical lift fan contained in each of said nacelles for collecting surrounding air and accelerating said air in a downwardly directed flow to produce substantially vertical lifting force, said fan being situated in spaced lateral relationship with said beam so that the cross-sectional area of said fan does not overlap said beam in plan view, and turbine drive means in each of said nacelles for driving each of said fans.

3. A propulsion system for a flying vehicle having at least one wing mounted on a fuselage, said system comprising:

a nacelle removably mounted on said wing in spaced relationship from said fuselage, propulsion means consisting of two turbine driven vertical lift fans and a source of high temperature gas, mounting means for mounting said propulsion means entirely within said nacelle, said fans each having an annular turbine surrounding the same in operative relationship therewith, said fans being adapted to direct a flow of air substantially downwardly to create a lifting force for vertical take-off and landing of said vehicle, releasable connection means for supporting said nacelle and propulsion means on said wing spaced apart from said fuselage, said source of gas mounted in said nacelle supplying gas in sufficient volume to operate said turbines for said fans to produce said lifting force, and duct means contained in said nacelle including at least one duct connecting said source of gas with said annular turbines.

4. The structure set forth in claim 3 above, wherein:

said duct means further includes at least one other duct adapted to direct said high temperature gas substantially rearwardly to provide forward thrust for said vehicle, and selectively operable means for directing said gas from said gas generating means in selectively controlled proportions through said one duct and through said other duct.

5. An air vehicle convertible from high speed forward take-off configuration to substantially vertical take-off configuration, comprising:

at least one wing mounted on said vehicle, first engine means for producing substantially horizontally directed thrust for forward movement of said vehcle, first engine support means for removably supporting said first engine means on said wing, second engine means for providing substantially vertically directed thrust for vertical take-off of said vehicle, second engine support means adapted to removably support said second engine means on said wing, and releasable connection means between said first and second engine support means and said wing for releasably supporting either of said engine support means whereby selective removal and replacement of said first engine support means by said second engine support means converts said vehicle from a relatively high speed transport to a relatively lower speed vertical take-off configuration.

6. In an aircraft adapted to be converted from a conventional forward speed take-off and landing vehicle to a substantially vertical take-off and landing vehicle:

a fuselage having a longitudinal axis through the center thereof, a pair of wings joined to said fuselage with one wing extending outwardly on each side thereof symmetrically about said axis in plan view, support means on each of said wings and spaced apart from said fuselage for removably and selectably supporting either turbojet engines or nacelle mounted vertical lift fans externally of said wings, turbojet engine means supportable on said support means, and nacelle mounted vertical lift fans supportable on said support means, said support means including means for completely removing said turbojet engines from said wings and replacing said turbojet engines by said nacelle mounted vertical lift fans.

7. In an aircraft:

a fuselage having a longitudinal axis through the center thereof, a wing extending outwardly on each side of said fuselage symmetrically about said axis in plan view, a nacelle connected to each of said wings, each of said nacelles having forwardly facing air inlet means and vertically facing air inlet means, at least one vertical lift fan mounted in each of said nacelles for receiving air thorugh said vertically facing inlet means, turbine drive means in each of said nacelles for driving each of said fans, gas generating means mounted in each of nacelles for receiving air through said forwardly facing inlet means, said gas generating means communicating with said turbine drive means for supplying hot gas to said last named means, exhaust gas exit means in each of said nacelles for directing hot gas generally rearwardly to provide forward thrust for said aircraft, duct means connecting said gas generating means to said exhaust gas exit means, and valve means in said duct means for selectively diverting some or all of said hot gas from said exhaust gas exit means to said turbine drive means, and connecting means for removably connecting said gas generating means and said nacelles to said wings.

8. A method of transporting cargo in a winged aerial vehicle, comprising:

loading said cargo in said vehicle, mounting forward thrust engine means consisting of at least two forward thrust engines on the wings of said vehicle for relatively high speed forward take-off and flight, transporting said cargo in said vehicle to an intermediate destination using said engine means, removing said forward thrust engine means from said vehicle at said intermediate destination and installing vertical thrust engine means on the wings of said vehicle for vertical take-off and landing, and transporting said cargo in said vehicle using said vertical thrust engine means to a final destination.

References Cited

UNITED STATES PATENTS

| | | | |
|---|---|---|---|
| 2,978,209 | 4/1961 | Kerry | 244—54 |
| 3,003,718 | 10/1961 | Peterson | 244—54 |
| 3,081,964 | 3/1963 | Quenzler | 244—54 X |
| 3,161,374 | 12/1964 | Allred et al. | 244—12 |
| 3,175,356 | 3/1965 | Culp | 244—12 X |
| 3,173,628 | 3/1965 | Marchant et al. | 244—12 |
| 3,220,669 | 12/1965 | Lewis et al. | 244—12 |
| 3,263,416 | 8/1966 | Bill et al. | 244—23 X |
| 3,266,243 | 8/1966 | Thomas | 244—12 X |

FOREIGN PATENTS 81,538   7/1956   Denmark.

MILTON BUCHLER, *Primary Examiner.*

THOMAS W. BUCHMAN, *Assistant Examiner.*

U.S. Cl. X.R.

244—54, 118